United States Patent [19]

Tranberg et al.

[11] 4,266,711

[45] May 12, 1981

[54] METHOD OF MANUFACTURING A LOCK CYLINDER FOLLOWER

[75] Inventors: Erik R. Tranberg, Eskilstuna; Bo G. Widén, Torshälla, both of Sweden

[73] Assignee: GKN-Stenman AB, Eskilstuna, Sweden

[21] Appl. No.: 61,560

[22] Filed: Jul. 27, 1979

Related U.S. Application Data

[62] Division of Ser. No. 844,445, Mar. 7, 1978, Pat. No. 4,185,481.

[30] Foreign Application Priority Data

Mar. 8, 1977 [SE] Sweden ................................ 7702602

[51] Int. Cl.³ ............................................... B23K 31/00

[52] U.S. Cl. ..................................... 228/135; 228/144; 228/173 C; 29/505

[58] Field of Search ............ 228/135, 136, 137, 141.1, 228/152, 182, 144, 153, 164, 171, 173 R, 173 C, 174; 29/505

[56] References Cited

U.S. PATENT DOCUMENTS

| | | | |
|---|---|---|---|
| 2,148,257 | 2/1939 | Budd | 228/182 X |
| 2,619,817 | 12/1952 | Lenton | 228/135 X |
| 3,871,063 | 3/1975 | Halvorsen | 228/135 X |

*Primary Examiner*—Richard B. Lazarus

*Attorney, Agent, or Firm*—Sughrue, Rothwell, Mion, Zinn and Macpeak

[57] ABSTRACT

A lock follower comprises two main parts, i.e. a central part and a cylindrical bearing part which are attached to each other. The central part is punched from a sheet-metal blank. The cylindrical bearing part partially surrounds the central part and has a slot through which a portion of the central part projects. The bearing part may comprise a piece of tubular material or alternatively a strip of material wound to cylindrical shape on a portion of the periphery of the central part. The two parts may be joined together by welding or by deformation of material belonging to either or both parts.

The invention also concerns a method of manufacturing a lock follower of the above-mentioned kind, whereby for the cylindrical bearing part initially either a tubular piece of material or a piece of strip material is used.

4 Claims, 4 Drawing Figures

METHOD OF MANUFACTURING A LOCK CYLINDER FOLLOWER

This is a division of application Ser. No. 884,445, filed Mar. 7, 1978, now U.S. Pat. No. 4,185,481.

The present invention relates to a lock follower, particularly a cylinder follower.

Such a follower has hitherto often been formed as a one-piece structure. It exhibits a cylindrical bearing part and a central part provided with a recess for co-action with a dogging element of the cylinder core. Extending outwardly from the cylindrical periphery of the bearing part is a portion associated with the central part-said portion being designated here the active portion of the follower-which portion often has the form of an arm or a toothed element and being arranged to cooperate with a corresponding operating element in the lock mechanism.

Such a cylinder follower is comparatively expensive to manufacture, primarily because of the high manufacturing cost of the casting operation and the subsequent machining operations, particularly the subsequent turning and drifting operations.

Another type of follower comprising two cup-shaped symmetrical halves is shown in U.S. Pat. No. 2,644,706. A follower of this kind does not exhibit sufficient strength and is unsuitable for the object here under concern.

An object of the present invention is to provide a lock follower of the aforementioned type in a much more simple manner and at lower cost by manufacturing the follower from two separate differently shaped main parts which are subsequently joined together.

In its widest aspect a lock follower according to the invention is mainly characterised by the fact that one main part comprises a central part which is punched or clipped from a sheet-material blank, the other main part comprising a cylindrical bearing part joined to said central part, said bearing part partially surrounding the central part and having a slot through which a portion of the central part projects.

The central part-even though it has a comparatively complicated shape, such as a part provided with toothed segments, or the like-can be manufactured in a simple manner in more or less finished form by punching or clipping the same directly from a sheet-metal blank. Thus, normally the central part of the follower requires no machining operations subsequent to punching the same from said blank.

The bearing part can also be produced in a simple manner from a thin material and at low costs. Thus, in accordance with a first embodiment, the bearing part comprises a piece of tubular material. This is provided with said slot for the outwardly projecting active portion of said central part in a suitable manner, e.g. by milling.

Alternatively the bearing part may comprise a piece of strip material provided with a central, longitudinally extending slot and wound to cylindrical form around a portion of the periphery of said central part and joined thereto. In this case, the slot is conveniently punched from the strip whilst this is still in a planar state, i.e. before it is wound to its cylindrical shape.

In the two embodiments mentioned the two parts are suitably joined together as by welding or riveting. The riveting is preferably accomplished by deforming material belonging to either or both parts. Normally two to four joining positions are sufficient.

One or two of these joining positions are conveniently located in the region of the ends of the slot in the bearing part.

The invention also relates to a method of manufacturing a lock follower of the aforementioned type, said method being substantially characterised by punching a central part of the follower from sheet-metal material and joining it to a bearing part having a slot so that a portion of the central part projects through the slot.

In accordance with one method of manufacture, the slot is made in a piece of tubular material, which is then cut to length to form the bearing part.

An alternative method of manufacture is characterised by cutting a slot in a piece of strip material and winding the strip to cylindrical shape around one portion of the periphery of the central part, so that another portion of the central part projects through the slot, and joining together the ends of the piece of strip material.

In this method of manufacture it is preferred that the strip material is wound by means of two cylindrical mandrels one on either side of the central part.

The invention will now be described in more detail with reference to some embodiments thereof illustrated in the accompanying drawings.

Figure 1:
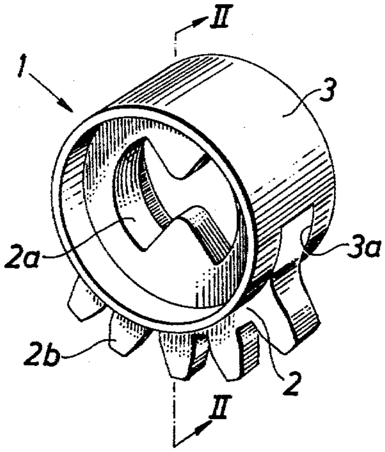
FIG. 1 is a perspective view of a cylinder follower according to the invention.
Figure 2:
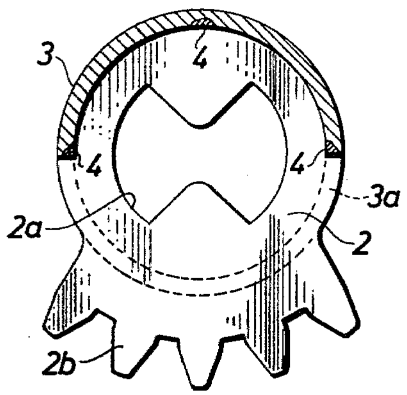
FIG. 2 is a vertical sectional view through the follower along the line II—II in FIG. 1.

With reference to FIGS. 1 and 2 a cylinder follower 1 comprises a central part 2 and a bearing part 3, of which the central part 2 exhibits an outwardly projecting active portion in the form of a toothed-segment 2*b* and is punched from a sheet-metal blank. The toothed-segment part 2*b* may also be given another shape, depending upon the type of element with which said part is intended to coact in a lock. The central part exhibits, in a conventional manner, an aperture 2*a* which may be considered to comprise two circle-sector parts which partially overlap each other. The aperture is arranged to cooperate with a dogging element (not shown) located on the core or plug of a lock cylinder.

A cylindrical bearing part 3 partially surrounds the central part 2 and has a slot 3*a* through which a portion of the central part, according to the illustrated embodiment the toothed-segment part 2*b*, projects.

The central part 2 and the bearing part 3 are joined together by means of three spot welds 4, of which two are located at the ends of the slot 3*a* in the bearing part 3.

The bearing part 3 may have the form of a piece of tubular material cut from tubular material of indefinite length, and may be provided with the slot 3*a* prior to being cut from said length.

Figure 3:
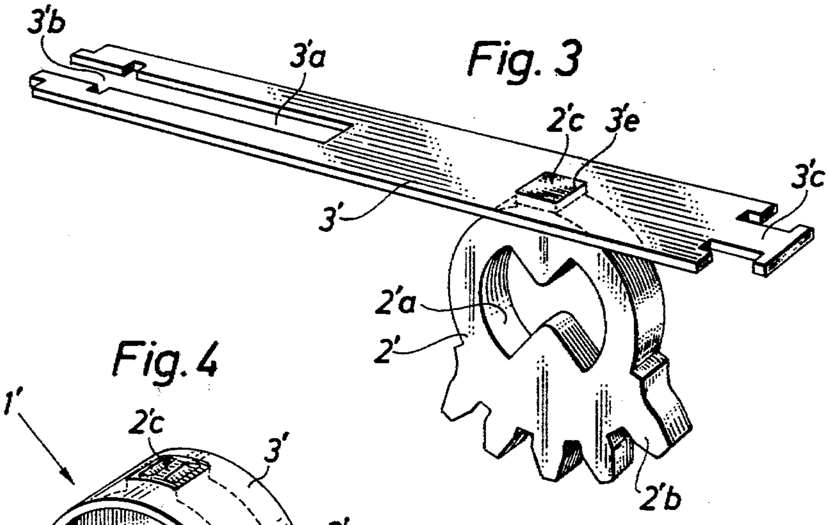
FIGS. 3 and 4 are perspective views illustrating different steps at the manufacture of a modified embodiment.
Figure 4:
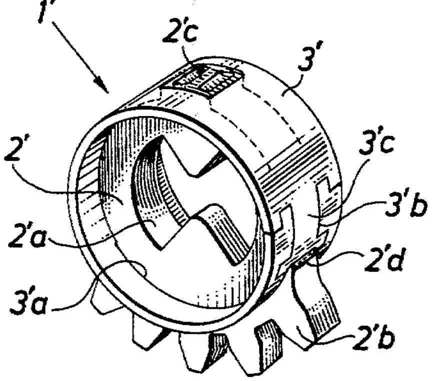

FIGS. 3 and 4 illustrate manufacture of a modified cylinder follower 1'. In this embodiment the bearing part comprises a piece of strip material 3' provided with a central, longitudinally extending slot 3'*a*. In addition the strip has a hole or recess 3'*e* intended to coact with a projection 2'*c* opposite to toothed-segment 2*b* of the central part 2'. The slot 3'*a* and the hole 3'*e* may be punched out of the strip material, preferably at the same time as said piece is cut from the strip.

As is shown in FIG. 3 strip 3' is initially in planar state applied to the central part 2', whereby the projection 2'c is received in hole 3'e. By means of mandrels (not shown) one on each side of the central part 2' the strip is then wound to cylindrical shape on the periphery of the central part, whereby the toothed-segment 2b passes through the slot 3'a.

Subsequent to completing the winding operation, the ends of the strip are joined together, suitably by welding or riveting such as deforming end portions of suitable shape.

Thus in the embodiment illustrated in FIGS. 3 and 4 the ends of the strip 3' are provided with corresponding substantially T-shaped connecting portions 3'b and 3'c, respectively. At the winding operation said portions engage each other. Mutual securing is accomplished by deforming the material in the region of joint. At the same time the projection 2'c and the portions of the central part positioned in the region of the ends of the slot 3'a are deformed. Such a deformed portion is shown in FIG. 4 where it is denoted 2'd. Then the two parts 2' and 3' are rigidly joined to each other without adding further material or using special fastening means.

Practically the manufacture is accomplished in an automatic machine whereby several of the described operations are carried out simultaneously or in rapid succession.

Neither of the described two methods of manufacture normally require any subsequent machining operation, such as turning or drifting of the lock follower, but that said lock follower is ready for immediate use.

What is claimed is:

1. A method of manufacturing a lock follower, comprising:

(a) punch stamping a generally circular central member having a toothed segment projecting outwardly from an arc portion thereof and a non-circular aperture from a blank of sheet-metal material, (b) forming a cylindrical bearing member having a partial circumferential slot between its ends of sufficient width to accommodate the thickness of the central member, the axial length of the bearing member being greater than the thickness of the central member, (c) inserting the central member through the slot and into circumferential engagement with the bearing member with the toothed segment projecting outwardly through the slot, and (d) securing the central and bearing members together.

2. A method according to claim 1, wherein the bearing member is formed by cutting a slot in a tubular piece of material, and thereafter cutting the piece of material to the required length.

3. A method of manufacturing a lock follower, comprising:

(a) punch stamping a generally circular central member having a toothed segment projecting outwardly from an arc portion thereof and a non-circular aperture from a blank of sheet-metal material, (b) punch stamping an elongated piece of strip material from a sheet thereof, said piece including a centered axial slot extending inwardly from one end thereof of sufficient width to accommodate the thickness of the central member and said piece having a width greater than the thickness of the central member, (c) wrapping the piece of strip material circumferentially around the central member with the toothed segment projecting outwardly through the slot to thus form a cylindrical bearing member surrounding the central member, and (d) joining the ends of the piece of strip material together.

4. A method according to claim 3, further comprising providing the central member with a radially outward projection circumferentially spaced from the toothed segment, punch stamping a correspondingly dimensioned aperture in the piece of strip material, and inserting the projection into the aperture during the wrapping step.

* * * * *